US012759268B2

(12) United States Patent
Pohlen et al.

(10) Patent No.: US 12,759,268 B2
(45) Date of Patent: Oct. 13, 2026

(54) LAMINATED GLAZING HAVING HOLOGRAPHIC FILM LAMINATED THEREIN

(71) Applicant: ACR II GLASS AMERICA INC., Nashville, TN (US)

(72) Inventors: Markus Walter Pohlen, Mückeln (DE); Steven Scott Christman, Nashville, TN (US); Emily Anne Curtis, Nashville, TN (US); Yu Matsuda, Nashville, TN (US)

(73) Assignee: ARC II GLASS AMERICA INC., Nashville, TN (US)

( * ) Notice: Subject to any disclaimer, the term of this patent is extended or adjusted under 35 U.S.C. 154(b) by 374 days.

(21) Appl. No.: 17/638,932

(22) PCT Filed: Aug. 28, 2020

(86) PCT No.: PCT/US2020/048418
§ 371 (c)(1),
(2) Date: Feb. 28, 2022

(87) PCT Pub. No.: WO2021/041817
PCT Pub. Date: Mar. 4, 2021

(65) Prior Publication Data

US 2022/0288895 A1 Sep. 15, 2022

Related U.S. Application Data

(60) Provisional application No. 62/894,419, filed on Aug. 30, 2019.

(51) Int. Cl.
*B32B 17/10* (2006.01)
*B60J 1/00* (2006.01)

(52) U.S. Cl.
CPC .. *B32B 17/10431* (2013.01); *B32B 17/10036* (2013.01); *B32B 17/10706* (2013.01);
(Continued)

(58) Field of Classification Search
None
See application file for complete search history.

(56) References Cited

U.S. PATENT DOCUMENTS 5,313,292 A * 5/1994 Wood ................ B32B 17/10036 430/1
5,360,501 A * 11/1994 Bolt ................... G02B 27/0103 156/275.5
(Continued)

FOREIGN PATENT DOCUMENTS

DE 20 2019 104 803 U1 10/2019
JP 2000221868 A 8/2000
(Continued)

OTHER PUBLICATIONS

Bronstein et al., U.S. Appl. No. 62/795,643 (Year: 2019).*
(Continued)

*Primary Examiner* — David Sample
(74) *Attorney, Agent, or Firm* — K&L Gates LLP

(57) ABSTRACT

A laminated glazing is disclosed. Among other things, the laminated glazing includes a first glass sheet; a first interlayer; a photopolymer film; a second interlayer; and a second glass sheet, wherein the total thickness of the second glass sheet and the second interlayer is from 0.5 mm to 2.5 mm.

20 Claims, 2 Drawing Sheets

(52) U.S. Cl.
CPC ..... *B32B 2307/40* (2013.01); *B32B 2307/732* (2013.01); *B32B 2605/006* (2013.01); *B60J 1/001* (2013.01)

(56) References Cited

U.S. PATENT DOCUMENTS

| | | | | |
|---|---|---|---|---|
| 2002/0163681 | A1 | 11/2002 | Taggi et al. | |
| 2012/0328843 | A1* | 12/2012 | Cleary | C03C 3/095 428/213 |
| 2016/0257095 | A1* | 9/2016 | Cleary | G02B 27/01 |
| 2018/0113314 | A1 | 4/2018 | Holland et al. | |
| 2018/0372935 | A1 | 12/2018 | Alexander et al. | |
| 2019/0101865 | A1 | 4/2019 | Popkova et al. | |
| 2019/0366691 | A1* | 12/2019 | Iwamoto | B32B 17/10036 |
| 2020/0230924 | A1 | 7/2020 | Bronstein et al. | |
| 2021/0039360 | A1* | 2/2021 | Ishikawa | B32B 17/10816 |

FOREIGN PATENT DOCUMENTS

| | | | |
|---|---|---|---|
| WO | 2013/005745 | A1 | 1/2013 |
| WO | WO-2019101713 | A1 * | 5/2019 |

OTHER PUBLICATIONS

Dixit et al. ("3D-printed miniaturized fluidic tools in chemistry and biology," Trends in Analytical Chemistry, 106 (2018) 37-52). (Year: 2018).*
Extended European Search Report for related European Application No. 20856520.0; action dated Sep. 22, 2022; (7 pages).
Beeck et al. Holographic mirrors laminated into windshields for automotive Head-Up Display and solar protective glazing applications. SPIE vol. 1507 Holographic Optics III: Principles and Applications, pp. 394-406, 1991.
Bruder et al. Mass Production of Volume Holographic Optical Elements (vHOEs) using Bayfol® HX Photopolymer Film in a Roll-to-Roll Copy Process. Proc of SPIE vol. 10127, 101270A Practical Holography XXXI: Materials and Applications, pp. 101270A-1 to 101270A-20, 2017.
Bayfol® HX200 Description and Application Information. Bayfol® Product Datasheet edition Jul. 14, 2020, pp. 1-6, 2020.
International Search Report and Written Opinion of the International Searching Authority for PCT Application No. PCT/US20/48418, mailed on Jan. 22, 2021, by the United States Patent & Trademark Office, 10 pages.

* cited by examiner

LAMINATED GLAZING HAVING HOLOGRAPHIC FILM LAMINATED THEREIN

CROSS REFERENCE TO RELATED APPLICATIONS

This application is a national phase application of PCT International Patent Application No. PCT/US2020/048418, filed on Aug. 28, 2020, which claims priority to U.S. Provisional Application No. 62/894,419 filed on Aug. 30, 2019, entitled "Laminated Glazing Having a Holographic Film Laminated Therein," the contents of which is incorporated by reference herein in its entirety.

TECHNICAL FIELD

The present disclosure generally relates to a laminated glazing having a holographic film laminated therein and a method of making such a laminated glazing having a holographic film laminated therein.

BACKGROUND

Head-up displays (HUDs) are used in vehicles to project an image which a driver may see without looking away from the vehicle windshield. Particularly, HUDs typically include a projector and reflect a projected image from a windshield to provide an image for a driver. However, a windshield has two reflective surfaces in inner and outer glass surfaces which may each create a reflected image. One of the reflected images may be weaker and is known as a "ghost image" and may lead to the driver perceiving a hazy or a double image.

Wedge-shaped interlayers have been used to align the images by adjusting the reflective point of the "ghost image" to match the reflection of the stronger image, creating a single image for the driver. However, a wedge-shaped interlayer is not adjustable and the images may be aligned only for drivers at a particular height. There is a need in the art for windshields having HUD capabilities for drivers with a range of heights.

One possible solution is to use p-polarized projector and a laminated film which reflects p-polarized light. Being near the Brewster angle, the glass surface reflections will not generate ghost images. Another possible solution is to use p- or s-polarized projector and a laminated film comprising a half wavelength retarder. Being near Brewster angle, depending on projector light polarization, only the inner or outer glass surface may reflect light. Laminating a film however may undergo the problem of short range deviations in the film surface which cause distortions in the HUD image.

Future HUD systems may favor larger HUD images which would need large projector apertures which are limited by available space in the vehicle dashboard. By using a holographic film which has focusing power (i.e. concave mirror feature), a smaller projector size may be used.

Some HUD constructions include holographic films which provide an image to the driver. The holographic films may be laminated to or in a glazing, as described in Manfred-Andreas Beeck et al., *Holographic mirrors laminated into windshields for automotive Head-Up Display and solar protective glazing applications*, Proc. SPIE, Vol. 1507, p. 394 (1991). However, laminating the film may cause particular difficulties, such as placement and curvature of the holographic film, as well as small scale deviations or unevenness in the film. There is a need in the art for a solution to at least these difficulties, among others.

One method of recording the holographic film may be commonly executed in two steps. First, a master hologram is generated by recording an interference pattern in a thin film of photosensitive polymer. Second, this master hologram is replicated in the hologram films as described in Friedrich-Karl Bruder et al., *Mass Production of Volume Holographic Optical Elements (vHOEs) using Bayfol® HX Photopolymer Film in a Roll-to-Roll Copy Process*, Proc. SPIE Vol. 10127, p. 101270A (2017). Where these holographic films are laminated in the glazing, deviations resulting from lamination may be visible in a HUD image.

SUMMARY OF THE DISCLOSURE

Disclosed herein is a laminated glazing, comprising: a first glass sheet; a first interlayer, a photopolymer film; a second interlayer; and a second glass sheet, wherein the total thickness of the second glass sheet and the second interlayer is from 0.5 mm to 2.5 mm.

In another aspect of the present disclosure, a method for preparing a glazing, comprises: laminating a first glass sheet, a first interlayer, a photopolymer film, a second interlayer, and a second glass sheet to provide a laminated glazing; and applying a reactive light to the photopolymer film through a master holographic film, wherein the reactive light transmits through the master holographic film, the second glass sheet, and the second interlayer, wherein the total thickness of the second glass sheet and the second interlayer is from 0.5 mm to 2.5 mm.

BRIEF DESCRIPTION OF THE DRAWINGS

The accompanying drawings, which are incorporated and constitute a part of this specification, illustrate one or more example aspects of the present disclosure and, together with the detailed description, serve to explain their principles and implementations.

DETAILED DESCRIPTION

Figure 1:
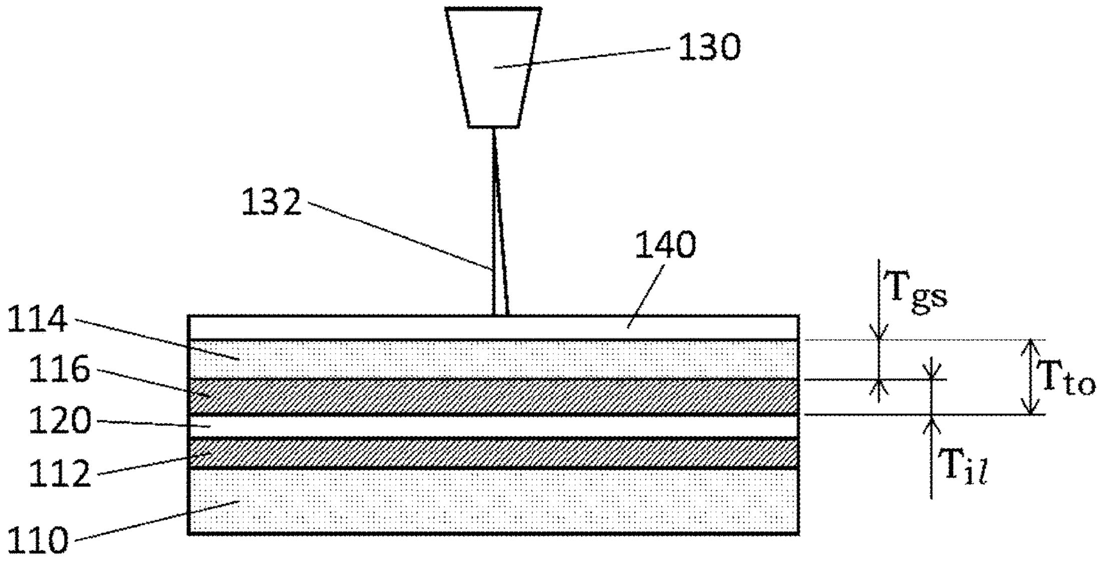
FIG. 1 illustrates a laminated glazing during replication, according to an exemplary aspect of the present disclosure.

In the following description, for purposes of explanation, specific details are set forth in order to promote a thorough understanding of one or more aspects of the disclosure. It may be evident in some or all instances, however, that many aspects described below can be practiced without adopting the specific design details described below.

A conventional laminated glazing may include a first glass sheet, an interlayer, and a second glass sheet laminated together. Glass sheets may include soda-lime silicate glass, described by ISO 16293-1:2008. The glass sheets may be bent to a desired shape prior to lamination. Glass bending may preferably occur by heat treatment from 560° C. to 700° C., more preferably from 600° C. to 660° C.

The interlayer may include a polymer adhesive material, such as polyvinyl butyral (PVB) or any other suitable laminating material, including ethylene vinyl acetate (EVA). In a typical lamination process, the interlayer may be placed between the first and second glass sheets. The glass sheets and interlayer may then be deaired prior to autoclaving. The deairing process may use mechanical pressure and/or vacuums to remove air from between the glass sheets. The deairing process may include any suitable process, such as pressure applied by rollers or by placing the glass sheets and interlayer in a vacuum bag or ring and applying vacuum pressure to the bag or ring. The materials may then be autoclaved, including the application of heat and pressure to the lamination materials, to provide a laminated glazing.

Laminated glazings may further include a film laminated between the glass sheets. In particular, laminating a film between two glass sheets may require a second interlayer such that the film is sandwiched between two adhesive interlayers, positioned between two glass sheets. Particularly, in a HUD compatible glazing, a film, such as a holographic film, may be used with a projector to provide an image viewable for the driver. Films, including holographic films, may further be laminated for other purposes, including lighting introduction to and/or extraction from a glazing or as anisotropic transmissive elements for solar protection. Laminated glazings may be used in any suitable application, including automotive glazings, such as windshields, sunroofs, back windows, or side windows. Laminating films may result in unevenness or wrinkles, including small scale deviations, in the film due to a lamination process and curvature in glass sheets, such as curvature in automotive glazings.

Particularly, holographic films may be formed of photopolymer films, which may, in some instances, include a substrate layer, a photopolymer layer, and a cover layer. The substrate layer may include any suitable material such as cellulose triacetate film (TAC), polyethylene terephthalate (PET), polycarbonate (PC), polyurethane (PU), or others. Holographic films may be copied or replicated optically with the use of an original, or master, holographic film. The replication process may include laminating a photopolymer film to a master holographic film and applying a light, such as a collimated line focused laser light, through the master film to the photopolymer film. The holographic films may be designed to account for the glass size and shape, including the intended position of a HUD image.

The photopolymer may be made from any suitable material capable of recording holograms, or particularly, volume holographic optical elements (VOEs), by optical polymerization of monomers and oligomers. A photopolymer may include polymerizing monomers, photopolymerization initiators, and matrix polymers. Functional (meth) acrylate, functional (meth) acrylamide, functional (meth) acrylonitrile, and functional (meth) acrylic acid may be used as polymerizing monomers. Generally known photopolymerization initiators may be used without any material limitation, and for example, monomolecular initiators bimolecular initiators may be used. Monomolecular initiators, such as triazine, benzophenone, benzoin, and benzyl ketal may be used. Matrix polymers may include, for example, polyurethanes, polyacrylates, and polymethylmethacrylates. As an example of a photopolymer, without limitation, which may be used in some embodiments of the present disclosure, Bayfol (Registered trademark) HX made of Covestro LCC may be exemplified.

Among other features, disclosed herein is a laminated glazing and a method of preparing such a laminated glazing having a holographic film therein. It may be preferable to replicate a holographic film in an already laminated photopolymer film with a master holographic film as to provide a holographic pattern formed over any deviations in the film which may be created in the photopolymer film before or during lamination. Deviations may cause local changes in the holographic pattern which may impact light projected to the laminated film. Particularly, the projected light may create an image that is hazy or incorrect. Replicating the laminated photopolymer film may reduce such effects of deviations in the film.

Where a laminated photopolymer film is replicated, it may be preferable that the master holographic film is as close to the photopolymer film as possible. A replication light may be applied to the photopolymer film at a precise angle during replication of the holographic film. The angle of light may have a tolerance range which may be influenced by the distance between the master holographic film and the photopolymer film. Particularly, as the distance between the master film and the photopolymer film decreases, the light angle tolerance may increase. The angle tolerance may further depend on the angle of light application as some angles may be more flexible than others. The reactive light may be applied to the glazing at an application angle. The application angle may have a tolerance of plus or minus from 0.05° to 15°. It may be desirable to maximize the light angle tolerance for production standards. Applying the reactive light to the laminated film at an angle within the tolerance range may provide for a holographic film having the desired holographic pattern.

During replication, the master holographic film may be placed adjacent to the laminated glazing. At least an interlayer and a glass sheet may be positioned between the laminated photopolymer film and the master holographic film. Particularly, the laminated glazing may include at least one glass sheet that is from 0.3 to 2.1 mm, preferably from 0.5 to 1.8 mm, more preferably from 0.7 to 1.6 mm, and even more preferably from 1.1 to 1.4 mm. The laminated glazing may include at least two glass sheets which may be the same or different thicknesses. It may be preferable in some embodiments that the glass sheet between the photopolymer film and the master holographic film during lamination be thinner than another glass sheet in the laminated glazing. The thinner glass sheet may have a thickness of 0.3 to 1.8 mm, preferably 0.3 to 1.6 mm, more preferably 0.3 to 1.4 mm, and even more preferably 0.3 to 1.1 mm.

A reactive light used during replication of a laminated photopolymer film may need to transmit through a master holographic film, a glass sheet, and an interlayer. In certain embodiments, the interlayer through which the reactive light is transmitted before reaching the laminated photopolymer film may have a thickness of equal to or less than 0.7 mm, preferably equal to or less than 0.5 mm, and more preferably equal to or less than 0.3 mm.

In some embodiments, the interlayer through which the reactive light transmits before reaching the laminated photopolymer film may be an adhesive film layer which may be formed on a glass sheet surface or on the photopolymer film. Preferably, an adhesive film layer may be from 1 to 100 μm, more preferably from 10 to 50 μm. The first and second interlayers which sandwich the photopolymer film may be the same or different thicknesses. In certain embodiments, the interlayer opposite the reactive light, relative to the photopolymer film, may have a thickness larger than the interlayer on the same side of the photopolymer film as the reactive light during replication. In some embodiments, the laminated glazing may have thin glass sheets and an interlayer may be used which has acoustic dampening qualities. Typically, an acoustic dampening interlayer may be at least 0.76 mm in thickness. It may be preferable in some embodiments that a reactive light does not pass through an acoustic dampening interlayer prior to reaching a laminated photopolymer film during replication.

After replication is completed with a reactive light, a bleaching light may be applied to the photopolymer film such that the photopolymer film is no longer reactive to a light source, including a reactive light. The bleaching light may be applied directly to the laminated glazing or may be applied to the glazing through the master holographic film. The photopolymer film may not be exposed to a light in the wavelength of the reactive light or the bleaching light prior to replication and bleaching.

FIG. 1 illustrates a glazing according to an exemplary embodiment of the present disclosure. Particularly, a laminated glazing includes a first glass sheet 110, a first interlayer 112, a photopolymer film 120, a second interlayer 116, and a second glass sheet 114. During a replication process, the second glass sheet 114, as shown in FIG. 1, may be adjacent to a master holographic film 140 and light 132 from a light source 130 may be directed through the master film 140, the second glass sheet 114 and the second interlayer 116 to the photopolymer film 120. The distance between the master film 140 and the photopolymer film 120 may be minimized to increase tolerances of the angle at which light 132 is applied during replication. The second glass sheet 114 may be thinner than the first glass sheet 110 where the reactive light 132 is directed to the photopolymer film 120 through the second glass sheet 114. A total thickness $T_{to}$ of the second glass sheet 114 and the second interlayer 116 is the sum of a thickness $T_{gs}$ of the second glass sheet 114 and a thickness $T_{il}$ the second interlayer 116. The total thickness $T_{to}$ may be in a range from 0.5 mm to 2.8 mm, preferably 0.7 mm to 2.5 mm, more preferably 1.1 mm to 2.3 mm. The thickness $T_{il}$ of the second interlayer 116 may be set to 0.001 to 0.7 mm. The second glass sheet 114 may have a concave or convex surface. Where the second glass sheet 114 is a concave surface, the second glass sheet 114 may face a vehicle interior when installed in a vehicle.

Figure 2:
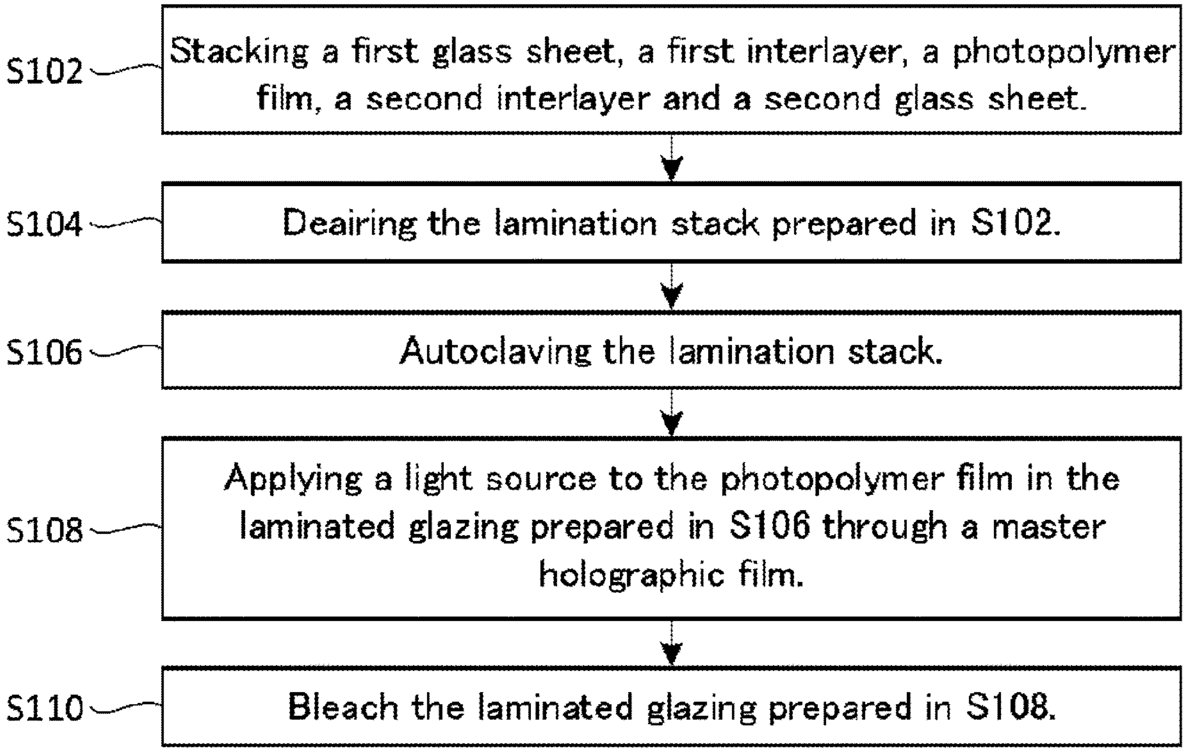
FIG. 2 shows a flow chart of a method for forming a glazing, according to an exemplary embodiment of the present disclosure; an FIG. 3 illustrates another laminated glazing during replication, according to an exemplary aspect of the present disclosure.

For example, a method of providing a holographic film in a laminated glazing may include the following steps, as shown in FIG. 2. Step S102 may include stacking a first glass sheet, a first interlayer, a photopolymer film, as second interlayer, and a second glass sheet. In some embodiments, the second interlayer may be formed on the photopolymer film or the second glass sheet. Step S104 may include deairing the lamination stack prepared in Step S102. Step S106 may include autoclaving the lamination stack. Step S108 may include applying a reactive light to the photopolymer film in the laminated glazing prepared in Step S106 through a master holographic film. The reactive light may have a light wavelength which may be a reactive light wavelength at which the photopolymer film may be replicated based on the master holographic film. Preferably, prior to applying the reactive light, the photopolymer film is not exposed to such a reactive light wavelength. Step S110 may include bleaching the laminated glazing prepared in Step S108.

Figure 3:
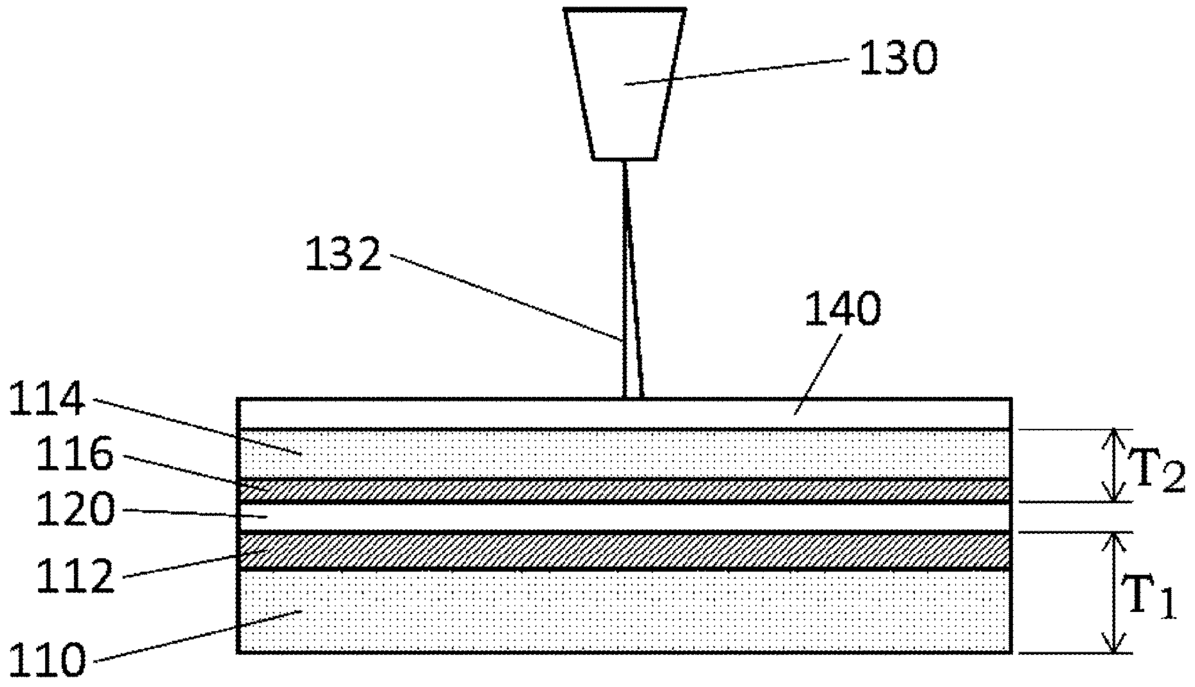

FIG. 3 shows another glazing according to an exemplary embodiment of the present disclosure. Particularly, a laminated glazing may include a first glass sheet 110, a first interlayer 112, a photopolymer film 120, a second interlayer 116, and a second glass sheet 114. The first glass sheet 110 and the first interlayer 112 may have a total thickness $T_1$. The second interlayer 116 may be thinner than the first interlayer 112, and the second glass sheet 114 may be thinner than the first glass sheet 110. The second glass sheet 114 and the second interlayer 116 having a total thickness $T_2$, as shown in FIG. 3, may be adjacent to a master holographic film 140, and light 132 from a light source 130 may be directed through the master film 140, the second glass sheet 114, and the second interlayer 116 to the photopolymer film 120. The distance between the master film 140 and the photopolymer film 120 may be minimized to increase tolerances of the angle at which light 132 is applied during replication. The total thickness $T_2$ may be lower than the total thickness $T_1$. Accordingly, the replication process may be performed to prepare a laminated holographic film having a desired holographic pattern.

In the description above, for purposes of explanation and not limitation, the examples with specific details are set forth to provide a thorough understanding of the present disclosure. However, it will be apparent to those having ordinary skill in the art that other embodiments with various modifications and variations may be practiced without departing from the spirit and scope of the present disclosure.

Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

The invention claimed is:

1. A laminated glazing, comprising:
- a first glass sheet;
- a first interlayer;
- a photopolymer film, the photopolymer film comprising a volume hologram;
- a second interlayer; and
- a second glass sheet,
- wherein a total thickness of the second glass sheet and the second interlayer is from 0.5 mm to 2.5 mm, and
- wherein the first glass sheet and the second glass sheet are the only glass components of the laminated glazing and each of the first interlayer, the photopolymer film, and the second interlayer are disposed between the first glass sheet and the second glass sheet.

2. The laminated glazing according to claim 1, wherein the total thickness of the second glass sheet and the second interlayer is from 0.7 mm to 2.0 mm.

3. The laminated glazing according to claim 1, wherein the thickness of the second glass sheet is from 1.0 mm to 1.6 mm.

4. The laminated glazing according to claim 3, wherein the thickness of the second glass sheet is from 1.1 mm to 1.4 mm.

5. The laminated glazing according to claim 1, wherein the thickness of the second interlayer is from 0.001 to 0.3 mm.

6. The laminated glazing according to claim 1, wherein a thickness of the first glass sheet is different from that of the second glass sheet.

7. The laminated glazing according to claim 6, wherein the first glass sheet is thicker than the second glass sheet.

8. The laminated glazing according to claim 7, wherein the second glass sheet has a concave surface and wherein the second glass sheet is configured to face a vehicle interior while installed in a vehicle.

9. The laminated glazing according to claim 1, wherein the second interlayer is formed on the photopolymer film or the second glass sheet.

10. The laminated glazing according to claim 1, wherein the laminated glazing comprises an automotive glazing.

11. A method for preparing a glazing, comprising:

laminating a first glass sheet, a first interlayer, a photopolymer film, a second interlayer, and a second glass sheet to provide a laminated glazing, the photopolymer film comprising a material configured to record a volume hologram; and applying a reactive light to the photopolymer film through a master holographic film, wherein the reactive light transmits through the master holographic film, the second glass sheet, and the second interlayer and records a volume hologram in the photopolymer film;

wherein the first glass sheet and the second glass sheet are the only glass components of the laminated glazing and each of the first interlayer, the photopolymer film, and the second interlayer are disposed between the first glass sheet and the second glass sheet.

12. The method according to claim 11, wherein the total thickness of the second glass sheet and the second interlayer is from 0.7 mm to 1.8 mm.

13. The method according to claim 12, wherein the total thickness of the second glass sheet and the second interlayer is from 1.0 mm to 1.6 mm.

14. The method according to claim 11, wherein the thickness of the second glass sheet is from 1.0 mm to 1.6 mm.

15. The method according to claim 14, wherein the thickness of the second glass sheet is from 1.1 mm to 1.4 mm.

16. The method according to claim 11, wherein the thickness of the second interlayer is from 0.001 to 0.3 mm.

17. The method according to claim 11, wherein a thickness of the first glass sheet is different from that of the second glass sheet.

18. The method according to claim 17, wherein the thickness of the first glass sheet is greater than that of the second glass sheet.

19. The method according to claim 11, wherein the second interlayer is formed on the photopolymer film or the second glass sheet.

20. The method according to claim 19, wherein the second interlayer has a thickness from 1 to 100 μm.

* * * * *